Patented Feb. 7, 1950

2,496,384

UNITED STATES PATENT OFFICE 2,496,384

EMULSION POLYMERIZATION PROCESS FOR THE MANUFACTURE OF COPOLYMERS OF HOMOGENEOUS COMPOSITION

Willem Leendert Johannes de Nie, Amsterdam, Netherlands, assignor to Shell Development Company, San Francisco, Calif., a corporation of Delaware No Drawing. Application July 22, 1946, Serial No. 685,380. In the Netherlands August 28, 1945

7 Claims. (Cl. 260—86.3)

This invention relates to a process for the manufacture of copolymers of homogeneous composition. More particularly, the invention pertains to an emulsion polymerization process for production of homogeneous copolymers from two or more vinylidene compounds.

Emulsion polymerization of a mixture of vinylidene compounds, i. e. compounds containing the group

produces a copolymer, the molecules of which contain units of each of the vinylidene compounds present in the monomeric mixture. Because of the fact that the rates of polymerization of the different vinylidene compounds in the monomer mixture are not the same, the copolymer which is produced at any instant will have a different ratio of units of the vinylidene compounds therein than that contained in the mixture of monomers. Furthermore, the ratio of units of the vinylidene compounds contained in the molecules of the copolymer is also dependent upon the particular ratio of monomers present in the monomeric mixture at the moment of formation of the copolymer molecule. For these reasons, simple batch emulsion copolymerization of a mixture of different vinylidene compounds results in the monomer mixture constantly changing in composition during the course of copolymerization since the faster polymerizing monomer is removed from the monomer mixture as copolymer more rapidly than the slower polymerizing monomer. A consequence of this changing ratio of compounds in the monomeric mixture is that the copolymer molecules produced at the first part of the batch copolymerization will contain a different ratio of units of the vinylidene compounds from the ratio contained in copolymer molecules produced at a later time. The net result of these variations which occur during the course of the copolymerization is that the total copolymer is composed of a series of materials having varying ratios of monomeric units therein. In other words, the copolymer from the simple batchwise polymerization is not of homogeneous composition.

These phenomena of copolymerization can be better understood by consideration of a hypothetical example. Suppose that copolymerization of a mixture of equal parts of monomer A and monomer B is effected in aqueous emulsion and that the relative rates of polymerization are such that when the monomer mixture contains 50% of monomer A and 50% of monomer B, the copolymer molecules which form will contain 75% of A and 25% of B. As the polymerization progresses, the monomer is in effect removed from the monomer mixture and converted into copolymer. Consequently, when copolymerization first begins, the monomer mixture contains 50% of monomer A and 50% of monomer B, but since the copolymer contains 75% of A and 25% of B, there will be three parts of monomer A removed from the monomer mixture for every part of monomer B removed. This will result in the monomer mixture changing in composition as the copolymerization progresses so as to give a decreasing concentration of monomer A. As this happens, the copolymer formed from the monomer mixture of new composition will produce copolymer molecules containing less than 75% of A. When all the monomer has been converted to polymer, it is apparent that the total copolymer formed will be composed of a series of copolymer fractions containing different proportions of A and B. A conventional chemical analysis of a sample of the total copolymer will indicate that it contains 50% of A and 50% of B, which is the same as the starting composition of the monomer mixture. However, this total copolymer is actually not homogeneous with respect to the composition of the copolymer fractions contained therein. These copolymer fractions have different proportions of A and B, but since the fractions are all mixed together in the total copolymer produced, the simple analysis will indicate only the average composition of the total copolymer. Individual fractions of the total copolymer will vary considerably from this average composition value. For example, the copolymer fraction produced at the start of the polymerization contains 75% of A while that produced at the end would contain considerably less than 50% in order that the overall composition be the 50% of A. The total copolymer produced is thus non-homogeneous with respect to the composition of the fractions of copolymer contained therein.

In many uses and commercial applications of emulsion copolymerization products, it is highly undesirable to use materials which are non-homogeneous in composition. This particularly applies to copolymers in which the properties change to a large extent with small variations of the ratio of monomer units contained in the copolymerization product. An example of copolymers which have a steep transition in properties with relatively little change in the ratio of the component monomers therein is the copolymer of vinyl chloride with vinylidene chloride. The copolymers containing from about 5% up to about 15% by weight of vinylidene chloride change rapidly in solubility in acetone with changing composition of the copolymer from a product which is substantially insoluble in acetone at the lower limit of vinylidene chloride content to a product being completely soluble in acetone at the upper limit. This property of complete solubility continues with increasing vinylidene chloride content up to about 65% and then from this percentage to about 80% vinylidene chloride, the solubility in acetone rapidly decreases from complete solubility to substantially no solubility. Vinyl chloride-vinylidene chloride copolymers have excellent properties for protective coating of surfaces. The copolymer may be applied for this purpose as a lacquer wherein the copolymer is dissolved in a solvent. It is apparent that the solubility of the copolymer is of essential importance for use in the lacquer. Copolymers produced by prior emulsion polymerization methods that are non-homogeneous in composition may well contain copolymer fractions of such composition that they are not completely soluble in the solvents employed in the lacquer with the result that although part of the copolymerization product will dissolve, the remainder is insoluble. Only by chance will the copolymerization in the customary manner have conditions chosen so that the non-homogeneous product will have all the fractions thereof possessing complete solubility in the lacquer solvent.

Moreover, many copolymers have other properties of usefulness which are dependent to a critical extent on small variations in the percentage of monomer constituents combined in the copolymer. For example, copolymers composed of about 93% to 97% by weight of vinylidene chloride and about 7% to 3% by weight of methyl acrylate have very desirable molding properties and the molded articles as such have properties making them very useful. Within this narrow range of proportions of constituents in the copolymer, the products have the necessary high tensile strength and the low water absorption not possessed by copolymers of higher percentages of methyl acrylate. Nevertheless, there is only a small decrease in softening temperature and hardness. In so narrow a range of composition for the copolymer, it is apparent that a non-homogeneous product containing copolymer fractions with compositions outside the narrow range cannot have the needed properties.

It has been proposed heretofore in U. S. Patent 2,100,900 to obtain copolymers of approximately homogeneous composition by emulsion polymerization of a mixture of two polymerizable compounds and adding to the monomer mixture during the polymerization the compound having the higher rate of polymerization at about the rate it is used up in forming the copolymer. While this process is an improvement over the method of simply copolymerizing a mixture of compounds without addition during polymerization of the faster polymerizing monomer, the process is not a complete solution to the problem of obtaining homogeneous copolymers, and the copolymers produced will be only approximately homogeneous under even the most favorable conditions of operation. Since the faster polymerizing monomer is added to the reaction mixture at the rate that it is consumed in forming the copolymer, it is apparent that as the polymerization progresses, the percentage of the faster polymerizing monomer in the mixture of monomers will increase because its amount remains constant while the amount of slower polymerizing monomer decreases by being converted into the copolymer. This results in a monomer mixture which constantly changes during the copolymerization and accordingly, since the percentage of constituents in the copolymer produced is dependent on the percentage of monomers with respect to one another, the copolymer will be only approximately homogeneous. From this it follows that the method can produce copolymers closely approximating homogeneity only when conditions are chosen so that the monomer mixture at the start of the polymerization contains a high percentage of the monomer having the slower rate of polymerization. In this manner, the amount of change of the slower polymerizing monomer is kept small and the composition of the monomer mixture does not vary to great extent. However, it is apparent that the method is practically not operative when it is desired to produce a copolymer having a composition which requires the use of a monomer mixture having a small percentage of the slower polymerizing monomer because this monomer is soon all used up and converted into copolymer with the result that the polymerization must be stopped for the reason that only the faster polymerizing monomer remains. Otherwise, the product would not be a copolymer having units of each monomer constituent combined therein after the slower polymerizing monomer has been used up.

The copolymers produced in accordance with the present invention have all the fractions thereof containing the same percentage of constituents. In other words, the copolymers are truly homogeneous in composition. These homogeneous copolymers are obtained by effecting copolymerization of a mixture of different vinylidene compounds in aqueous emulsion while adding to the polymerizing system a mixture of monomers of the same composition as the constituents are present in the forming copolymer, the rate of addition being approximately the same as the conversion of the monomers into copolymer. By following the procedure of the invention it becomes apparent that the composition of a monomer mixture undergoing copolymerization will remain constant during the entire polymerization, and that consequently, the desired copolymer of homogeneous composition will be produced.

In order that the total copolymer obtained will not be contaminated with copolymer fractions of different composition than the bulk of the copolymer products, the polymerization process is preferably stopped at the time the addition of the mixture of monomers is discontinued.

The addition of the mixture of monomers to the emulsified reaction mixture can be done either continuously or intermittently. When intermittent addition is employed it is desirable that the increments of monomer addition be sufficiently small and frequent that the concentration of constituents in the copolymerizing monomer mixture does not vary more than would cause a variation of more than about 2% in concentration of the major constituent in the copolymer from the average concentration of that constituent therein.

Copolymerization in aqueous emulsion according to the method of the invention may be effected in either batchwise or continuous fashion. In either case, an aqueous solution is made up containing an emulsifying agent and a polymerization catalyst. The usual reactor for emulsion polymerization is employed which is fitted with blades or paddles for keeping the emulsion in a state of agitation. The reactor also contains heating or cooling means for controlling the temperature of the reaction mixture. The mixture of monomers of composition which will give a copolymer of desired percentage of monomer constituents therein is emulsified with the aqueous solution containing emulsifying agent and polymerization catalyst by agitation, and as soon as copolymerization has begun, additional monomers are introduced into the copolymerizing mixture at about the same rate that they are consumed in forming the copolymer. The composition of the added monomers is the same or approximately the same as that of the copolymer being formed. When copolymerization is effected in continuous fashion, the aqueous emulsion is continuously fed through a series of reaction zones and the added monomer mixture is fed into one or more of the successive reaction zones following the first in the stream of flow.

Besides enabling production of homogeneous copolymers having any desired composition, the addition of the mixture of fresh monomers to the aqueous emulsion of copolymerizing compounds was found to give a higher rate of copolymerization than when no fresh monomers were added, and also, the copolymers produced had a high degree of polymerization with narrow distribution of molecular weight ranges for the polymer contained therein. Copolymers having broad distribution and containing considerable proportions of low molecular weight materials are unstable and subject to development of color during the heating and working operations used in molding the copolymers into articles of manufacture. Copolymers with a sharp narrow distribution of fractions of about the same high molecular weight are obtainable by the method especially when the copolymerization is stopped at the time the addition of the monomers is discontinued.

The process may be applied to additive copolymerization in aqueous emulsion of two or more substantially water-insoluble polymerizable vinylidene compounds, i. e. compounds containing the group

which undergo addition polymerization by carbon-to-carbon bonding between the olefinic carbon atoms therein. Preferably, two different compounds are used which contain the polymerizable group

and contain no other polymerizable group such as vinyl halides like vinyl chloride or bromide; vinyl esters of saturated monocarboxylic acids such as vinyl acetate, propionate or butyrate; vinylidene chloride or bromide; styrene, methyl styrene, chlorostyrene or dichlorostyrene; methyl, ethyl or butyl acrylates or methacrylates; allyl or methylallyl acetate or butyrate; acrylonitrile or methacrylonitrile; isobutylene or amylene; methyl vinyl or methyl allyl ether; methyl vinyl or methyl isopropenyl ketone; and like singly olefinic compounds together with their homologues. These copolymers obtained from two or more compounds containing the single olefinic group therein and no other polymerizable group are thermoplastic materials. If desired, copolymerization can be effected between one or more singly olefinic compounds and one or more vinylidene compounds which contain a plurality of olefinic linkages between aliphatic carbon atoms that are adapted to formation of addition polymers or, if preferred, between two or more of the vinylidene compounds containing a plurality of additive polymerizable groups therein, such as butadiene-1,3, isoprene, 2,3-dimethylbutadiene-1,3, chloroprene, divinyl benzene, 2-methylpentadiene-2,4, 2-methylpentadiene-1,3, ethylene glycol dimethacrylate, diallyl phthalate, diallyl diglycolate, allyl vinyl phthalate, diallyl maleate, diallyl fumarate, diallyl ether of ethylene glycol, triallyl ether of glycerol, and similar compounds as well as their homologues. The copolymers are prepared from mixtures of different vinylidene compounds wherein any one is preferably present in amount of at least 1% or more in the copolymer. If desired, however, smaller amounts may be used. Thus, a copolymer can be prepared containing about 0.5% divinyl benzene with 85% to 95% vinyl chloride and the remainder being vinyl acetate. This copolymer is thermoplastic, but if a thermosetting copolymer is desired, the percentage of divinyl benzene can be increased to obtain this result, e. g. by use of up to about 5% divinyl benzene. In any event, at least an appreciable quantity of copolymerizable vinylidene compound present in least amount is contained in the mixture of monomers undergoing copolymerization, i. e. at least 0.1% or more.

The aqueous phase employed to effect the emulsion polymerization in the process of the invention is made up with the emulsifying agent therein. Various emulsifying agents are suitable, such as soaps like sodium and/or potassium myristate, laurate, palmitate, oleate, stearate, rosinate and/or hydroabietate; or alkali metal alkyl or alkylene sulfates or sulfonates such as sodium and/or potassium lauryl sulfate, cetyl sulfate, oleyl sulfonate, stearyl sulfonate, sulfonated Turkey Red oil, sulfonated mineral oils, etc., as well as ammonium or ethanolamine salts thereof; or salts of higher amines like lauryl amine hydrochloride or stearyl amine hydrochloride. Ordinarily, about 2% to 5% of the emulsifying agent or mixtures thereof in the aqueous phase is suitable. In many cases it is desirable to work with an acidic emulsion such as one having a pH in the range of about 1 to 6. This is attained by the use of proper emulsifying agents which function effectively in acid medium such as sodium alkyl sulfates or amine salts like lauryl amine hydrochloride and by adjusting the pH with addition of a strong mineral acid such as hydrochloric, sulfuric or nitric acid. In some cases small changes in the pH in the reacting medium will have marked effect on the rate of polymerization. Thus, in copolymerization of vinyl chloride with vinylidene chloride in the process of the invention there is an appreciable decrease in the rate of polymerization on increasing the pH from about 2.5–2.6 to 3.2–3.3 indicating that the maximum rates are obtained by use of a somewhat more acid reaction medium such as below about 3.

An oxygen-yielding catalyst is employed to effect the desired polymerization. Preferably the catalyst is water-soluble as is the case with hydrogen peroxide, sodium or potassium persulfate, percarbonate, and perborate, peracetic acid, and tertiary butyl hydroperoxide although, if desired, other catalyst can be used like benzoyl peroxide, acetyl peroxide, lauryl peroxide, acetone peroxide, etc. About 0.1 to 5% catalyst in the reaction medium is suitable.

The temperature of operation of the process of the invention will vary over considerable limits depending for best results to considerable extent on the particular mixture of vinylidene compounds being copolymerized. Thus, temperature limits may be as low as 15° C. and in extreme cases as high as 150° C. In some cases the temperatures may be higher or lower than even these limits. Ordinarily temperatures from about 20° C. to 80° C. are employed. Sufficient pressure is of course applied to the reaction mixture so as to maintain the constituents therein in liquid phase. When the process is effected in continuous manner, it is preferred to operate the successive reaction zones at approximately the same temperature. Especially good results are obtained in polymerizing at 15° C. to 30° C. for the reason that the copolymer obtained is homogeneous in composition and also has a very high degree of polymerization with narrow distribution of molecular weight ranges.

In executing the process of the invention in continous fashion, the method is preferably carried out so the substances being copolymerized in aqueous emulsion are conducted through a series of distinct reaction zones like separate connected reaction chambers. The flow in this application of the method is such that it continuously advances from chamber to successive chamber without appreciable, or preferably no, back flow. The number of reaction zones in series is preferably at least four and may be as many as twenty or even higher. The added mixture of monomers is continuously introduced at one or more of the reaction zones other than the first. The polymerization of the mixture of monomers in any single reaction zone will not be complete and the monomers transferred as such to subsequent zones will be polymerized there. The fresh monomers are preferably introduced in the form of aqueous emulsion at the successive points in the stream. Addition of fresh monomers in the form of aqueous emulsion is also preferred in batchwise operation. For this purpose, more concentrated emulsion is used than is present in the reaction system. The initial emulsified mixture of monomers can contain about 5% to 20% of the monomers in the aqueous emulsion, and the emulsion added subsequently in the stream of flow will be more concentrated both with respect to the monomers, i. e. 20% to 50%, and with respect to emulsifying agent and the catalyst used therein, which may have a concentration of double that of the initial material. In effecting the reaction in continuous fashion, the fresh monomers added at subsequent points are introduced at about the same rate as the amount of copolymer is produced in the prior reaction zone. It is important that the added aqueous phase or emulsion does not appreciably disturb the pH of the emulsion already in the reaction zone. In other words, the pH of the stream where the polymerization is occurring is maintained substantially constant by addition of material having the pH thereof suitably adjusted. Otherwise, the maximum effect of the high rate of polymerization may not be so completely realized.

The rate of copolymerization in aqueous emulsion is also dependent upon another factor. It has been found that on increasing the percentage of monomer mixture from zero to about 5% to 7%, the rate of polymerization rapidly increases in this range, but that on increasing the monomer concentration in the emulsion beyond this point, the rate of polymerization is not materially affected. In order that the maximum rate of copolymerization can be effected, it is therefore desirable that the concentration of monomers present in the reaction mixture be maintained higher than about 5% to 7% by weight.

The addition of fresh monomers is continued in the process preferably as long as possible. However, it has been found that when the copolymer concentration in the reaction mixture rises to about 30%, the presence of a large concentration of monomers will cause the copolymer to coagulate and precipitate from the emulsion so that agglomerated masses of copolymer deposit on the surfaces of the reactor. The addition of fresh monomer is discontinued preferably before this sort of result happens both when operating in batchwise or continuous fashion.

As was explained before, the composition of the initial monomer mixture will often deviate considerably from the ratio in which the monomers are desired to be present in the copolymer. This deviation will be greater as the differences in the rates of polymerization of the monomers under the given circumstances are greater.

The process of the present invention is applied to greatest advantage in those cases where the rate of copolymerization is not particularly high or low, e. g. copolymerization in emulsion where the rate amounts to from about 50 to 400 grams of copolymer per liter of emulsion per hour, and where the differences in rates of polymerization of the different monomers and the influence they have on each other are considerable. For example, when copolymerization in emulsion of vinyl chloride with about 40% by weight of methyl methacrylate is effected in simple batchwise manner, the reaction actually takes place in two more or less distinct steps. In this case, the rate of polymerization of the second stage seems to be more than sixfold that of the first stage. From analysis of the reaction products formed and of the unconverted monomers remaining during the polymerization, it appears that originally a copolymer is formed composed of approximately 85% by weight of methyl methacrylate and about 15% by weight of vinyl chloride. After a considerable portion of the methyl methacrylate has polymerized, the composition of the polymerization product changes first gradually but later more rapidly and during the second stage, under the same conditions with respect to temperature, stirring velocity, etc., practically pure polyvinyl chloride forms at a rate which, as already noted, is considerably higher than that occurring in the first stage and which is practically in conformity with the rate obtained when polymerization in emulsion is effected exclusively with vinyl chloride. Accordingly, the copolymer produced is very non-homogeneous with respect to composition. However, even in this extreme case, the method of the invention provides perfectly homogeneous copolymerization products.

The rate of addition of the monomer mixture added to the reaction system which is needed to compensate for monomer that has been converted to copolymer is readily ascertainable. This is most conveniently accomplished by withdrawing a sample of the emulsified reaction mixture and determining the specific gravity of it whereby the amount of polymer formed can be determined and thus the rate of addition ascertained. By a few simple experiments in a trial run wherein the polymerization is permitted to progress and samples are removed at different times with determination of the specific gravity of the samples and their polymer content in usual fashion, a correlation can be made up between specific gravity and polymer content. From correlation of the rate of copolymer formation as determined by specific gravity of samples of emulsion, the rate of addition of the mixture of monomers can be determined. The proper rate of addition of monomer thus becomes simply a matter of operator skill.

As was pointed out hereinbefore, a particular mixture of monomers will not at any moment give a copolymer having the same composition. The composition of the initial monomer mixture needed to obtain the copolymer of any desired composition can be ascertained by simple trial. The composition of an initial monomer mixture is arbitrarily chosen and subjected to the selected reaction conditions. Immediately upon the polymerization beginning to occur, a sample of polymer is withdrawn from the reaction mixture and analyzed. If this copolymer is not of the desired composition with respect to the percentage of monomeric constituents combined therein, an adjustment in the initial composition of monomer is made and the trial repeated. Those skilled in the art are able to ascertain exactly the composition of the monomer mixture needed in only a few trial runs. The composition of the mixture of monomers added during the course of polymerization is, of course, simply the same as that of the desired copolymer.

For the purpose of illustrating the invention in greater detail as well as giving some comparative results obtained according to prior methods, the following examples are given.

EXAMPLE I

About 50 liters of a 2% aqueous solution of the sodium salt of alpha-hydroxy octadecane sulfonic acid to which about 0.2% of hydrogen peroxide was added and which was reduced to a pH value of about 3 by the addition of hydrochloric acid was introduced into an autoclave made of V2A steel having a capacity of about 50 liters and provided with a high speed stirrer. To this aqueous solution in the reactor was added about 9 kg. of sharply fractionated vinyl chloride and 1 kg. of methyl methacrylate. The polymerization was effected at about 55° C. and an induction period of approximately 20 minutes occurred before polymerization began. Approximately 5 minutes after the polymerization began to occur, the rate of polymerization had reached about 100 g. of copolymer per liter of emulsion per hour. The copolymer formed under these reaction conditions contained about 60% by weight of vinyl chloride and about 40% by weight of methyl methacrylate.

Approximately 5 minutes after the polymerization, additional monomers were introduced in the form of an emulsion. This emulsion was composed of about two thirds parts by weight of a 3% aqueous solution of the sodium salt of alpha-hydroxy octadecane sulfonic acid which by the addition of hydrochloric acid had the pH thereof reduced to about 2.8, and one third part by weight of a mixture of 60% vinyl chloride and 40% methyl methacrylate. This additional emulsion was pumped in at a rate which corresponded to about 6.8 kg. of monomer mixture per hour and was not varied during the run. The added emulsified mixture was pumped in at a rate of about 20 liters per hour.

As a result of the addition of fresh monomers to the polymerizing system, the rate of polymerization increased rather rapidly from the 100 grams of copolymer per liter of emulsion per hour to about 150 grams and remained constant at this rate for approximately ½ hour after which it then gradually decreased so that the rate at the moment when the run was discontinued, amounted to about 110 grams of copolymer per liter of emulsion per hour. The copolymerization was discontinued 95 minutes after the polymerization had begun. At this point, the reactor contained about 80 liters of material. Approximately 30 liters of emulsion had been introduced during the copolymerization.

At intervals after the polymerization had set in, small samples of copolymer suspensions were withdrawn from the autoclave, immediately coagulated by addition of a solution of magnesium sulfate, washed with water, dried in vacuo at 60° C., finally extracted with hot methanol and dried again. The chlorine content was determined for these samples and the viscosity of 5% solution in cyclohexane at 25° C. was determined. The results of these measurements are given in Table I.

Table I

| Time at which sample was taken in minutes after polymerization set in— | Chlorine content in per cent by weight | Wt. per cent Vinyl chloride in copolymer | Viscosity of cyclohexanone solution in centipoises |
|---|---|---|---|
| 5 | 33.5 | 59.0 | 12.8 |
| 15 | 33.8 | 59.5 | 13.1 |
| 30 | 34.0 | 59.9 | 13.4 |
| 45 | 33.5 | 59.0 | 13.5 |
| 60 | 34.1 | 60.0 | 13.6 |
| 75 | 34.1 | 60.0 | 13.5 |
| 90 | 33.8 | 59.5 | 13.4 |
| 95 | 33.9 | 59.7 | 13.2 |

For the purpose of comparison, Table II following contains the data obtained with a simple batchwise operation in which the initial monomer emulsion was composed of 60 parts by weight of vinyl chloride and 40 parts by weight of methyl methacrylate. No extra monomers were introduced during the polymerization and the polymerization was continued until practically all of the monomers had been converted into polymer.

Table II

| Time at which sample was taken in minutes after polymerization set in— | Chlorine content in per cent by weight | Wt. per cent Vinyl chloride in copolymer | Viscosity of cyclohexanone solution in centipoises |
|---|---|---|---|
| 195 | 6.3 | 11.1 | 9.3 |
| 210 | 7.1 | 12.5 | 9.3 |
| 255 | 17.8 | 31.4 | 12.0 |
| 270 | 25.3 | 44.5 | 15.3 |
| 300 | 32.0 | 56.4 | 15.4 |
| 360 | 34.6 | 60.9 | 15.7 |

While the analysis of the copolymer produced by the simple batchwise method indicates that the final polymer contains about 60% of vinyl chloride, this is not actually true because the copolymer is very decidedly non-homogeneous. The analysis of the product at any moment is based on the copolymer produced at the start plus copolymer being produced up to the time the sample is withdrawn. For example, after 195 minutes the copolymer seemed to indicate that it contained about 11% of vinyl chloride. However, this 11% vinyl chloride copolymer remained in the reaction mixture and a copolymer having a higher percentage of vinyl chloride was produced after 195 minutes had elapsed in order to give the results with increased percentage in the copolymer. It is therefore apparent that while the analysis of the copolymer taken at 360 minutes indicated a vinyl chloride content of about 60%, the copolymer being produced between 300 and 360 minutes, for example, actually must have had a higher percentage of vinyl chloride therein in order to have the average percentage of vinyl chloride be 60% when the starting copolymer at 195 minutes showed only 11% vinyl chloride. On the other hand, the copolymer produced by the method of the invention had a vinyl chloride percentage varying only between 59% and 60% throughout the whole course of the run. Consequently this copolymer was almost perfectly homogeneous with respect to composition.

EXAMPLE II

The copolymerization was effected in a continuous manner. The apparatus consisted of 8 autoclaves made of V2A steel equipped with stirrers and having a capacity of about 50 liters each. These were connected in series and entirely filled with liquid. The connection between the autoclaves were made of short V2A steel pipes. The temperature of the reaction mixtures in each of the autoclaves was adjusted to about 19° C. with the aid of cooling coils in the autoclaves.

About 50 liters per hour of a 2% solution of sodium cetyl sulfate to which about 0.2% by weight of hydrogen peroxide was added and which was reduced to a pH of about 2.5 by means of hydrochloric acid, was pumped into the first autoclave at a uniform rate. Also introduced into the first autoclave was about 5.7 kg. of sharply fractionated vinylidene chloride and 0.3 kg. of methyl acrylate (95% vinylidene chloride and 5% methyl acrylate). The copolymer formed in the first autoclave had a composition of about 90% vinylidene chloride and 10% methyl acrylate.

During each hour there was pumped into the second up to and including the sixth autoclave about 3 kg. of a 3% aqueous solution of sodium cetyl sulfate which also had been reduced to a pH of about 2.5 by addition of hydrochloric acid, 1.8 kg. of sharply fractionated vinylidene chloride, and 0.2 kg. of methyl acrylate (90% vinylidene chloride and 10% methyl acrylate). The monomer and polymer concentrations in the autoclaves were then measured at frequent intervals and the rates of polymerization were calculated from these values. The rates at which the above emulsion was introduced into autoclaves 2 to 6 were regulated so that in each of the autoclaves as much monomer mixture was added to the system as was consumed by polymerization in the preceding autoclave. After the system had settled down to a steady state, which was approximately 15 hours after the pumping in of the components had begun, the rates of pumping and polymerization were measured, which rates are given in Table III. The rates of polymerization were determined by withdrawing samples of the emulsion from each autoclave and separating the polymer therefrom. This polymer was analyzed for chlorine content in order to determine the percentage constituent of each monomer therein.

Table III

| No. of autoclave | Quantities pumped in in kg./hour | | | Rate of polymerization in grs. of polymer per litre emulsion per hour | Yield in copolymer in kg. per hour per autoclave | Chlorine content in percent by wt. of the dry polymer, extracted with methyl alcohol | Wt. percent vinyl chloride in copolymer |
|---|---|---|---|---|---|---|---|
| | vinylidene chloride | methyl acrylate | water phase | | | | |
| 1 | 5.7 | 0.3 | 50 | 36 | 1.8 | 67.1 | 91.6 |
| 2 | 1.62 | 0.18 | 2.7 | 42 | 2.1 | 67.0 | 91.5 |
| 3 | 1.89 | 0.21 | 3.15 | 38 | 1.9 | 66.7 | 91.1 |
| 4 | 1.71 | 0.19 | 2.85 | 32 | 1.6 | 66.1 | 90.3 |
| 5 | 1.44 | 0.16 | 2.4 | 28 | 1.4 | 66.3 | 90.6 |
| 6 | 1.26 | 0.14 | 2.1 | 24 | 1.2 | 66.7 | 91.1 |
| 7 | | | | 10 | 0.5 | 67.0 | 91.5 |
| 8 | | | | 2 | 0.1 | 67.0 | 91.5 |

The analysis of the copolymers produced indicates that the products are very homogeneous in composition.

I claim as my invention:

1. In a process for production of copolymer of substantially homogeneous composition wherein a mixture containing at least 1% each of monomers of two substantially water-insoluble polymerizable compounds, each of which contains the polymerizable group

and no other polymerizable group, is subjected to polymerizing conditions in aqueous emulsion, the improvement which comprises introducing a mixture of monomers of the polymerizable compounds to the reaction mixture at about the moment when copolymerization begins, the composition of the added monomers being substantially the same as the composition of the monomer constituents chemically combined in the copolymer; continuing the addition of the monomer mixture during the course of the copolymerization at about the rate at which copolymer is formed so that the composition of the monomers undergoing copolymerization does not appreciably change during the polymerization; and stopping the copolymerization at about the same time that addition of further monomers to the copolymerizing mixture is discontinued.

2. In a process for production of copolymer of substantially homogeneous composition wherein a mixture containing at least 1% each of monomeric vinyl chloride and methyl methacrylate is subjected to polymerizing conditions in aqueous emulsion, the improvement which comprises introducing a mixture of monomers of the polymerizable compounds to the reaction mixture at about the moment when copolymerization begins, the composition of the added monomers being the same as the composition of the monomer constituents chemically combined in the copolymer; continuing the addition of the monomer mixture during the course of the copolymerization at about the rate at which copolymer is formed so that the composition of the monomers undergoing copolymerization does not change appreciably during the copolymerization; and stopping the copolymerization at about the same time that addition of further monomers to the polymerizing mixture is discontinued.

3. In a process for production of copolymer of substantially homogeneous composition wherein a polymerizable mixture consisting of 90% monomeric vinyl chloride and 10% monomeric methyl methacrylate is subjected to polymerizing conditions in aqueous emulsion, the improvement which comprises introducing a polymerizable mixture consisting of 60% monomeric vinyl chloride and 40% monomeric methyl methacrylate to the reaction mixture at about the moment when copoylmerization begins; continuing the addition of the 60% vinyl chloride—40% methyl methacrylate monomer mixture during the course of the copolymerization at about the rate at which copolymer is formed so that the composition of the monomers undergoing copolymerization does not change appreciably during the copolymerization; and stopping the copolymerization at about the same time that addition of further monomers to the polymerizing mixture is discontinued.

4. In a process for production of copolymer of substantially homogeneous composition wherein a polymerizable mixture consisting of 90% monomeric vinyl chloride and 10% monomeric methyl methacrylate is subjected to polymerizing conditions in aqueous emulsion, the improvement which comprises introducing a polymerizable mixture consisting of 60% monomeric vinyl chloride and 40% monomeric methyl methacrylate to the reaction mixture containing monomeric vinyl chloride and methyl methacrylate in the proportions of 90% of the former to 10% of the latter within 5 minutes of the time at which copolymerization begins; continuing the addition of the 60% vinyl chloride—40% methyl methacrylate monomer mixture during the course of the copolymerization at the rate at which copolymer is formed so that the composition of the monomers undergoing copolymerization does not change during the copolymerization; and stopping the copolymerization at the same time that addition of further monomers to the polymerizing mixture is discontinued.

5. In a process for production of copolymer of substantially homogeneous composition wherein a polymerizable mixture consisting of 90% monomeric vinyl chloride and 10% monomeric methyl methacrylate is subjected to polymerizing conditions in aqueous emulsion, the improvement which comprises introducing a mixture of polymerizable compounds consisting of 60% vinyl chloride and 40% methyl methacrylate to the reaction mixture containing 90% monomeric vinyl chloride and 10% monomeric methyl methacrylate as soon as the copolymerization of the monomers therein begins; continuing said introduction of the 60% vinyl chloride—40% methyl methacrylate monomer mixture during the course of the copolymerization at the rate at which copolymer is formed; and stopping the copolymerization at the same time that addition of further monomers to the polymerizing mixture is discontinued.

6. In a process for production of copolymer of substantially homogeneous composition wherein a mixture containing at least 1% each of monomeric vinylidene chloride and methyl acrylate is subjected to polymerizing conditions in aqueous emulsion, the improvement which comprises introducing a mixture of monomers of the polymerizable compounds to the reaction mixture at about the moment when copolymerization begins, the composition of the added monomers being substantially the same as the composition of the monomer constituents chemically combined in the copolymer; continuing the addition of the monomer mixture during the course of the copolymerization at about the rate at which copolymer is formed so that the composition of the monomers undergoing copolymerizatin does not change appreciably during the copolymerization; and stopping the copolymerization at about the same time that addition of further monomers to the polymerizing mixture is discontinued.

7. In a process for production of copolymer of substantially homogeneous composition wherein a mixture containing at least 1% each of monomeric vinyl chloride and vinyl acetate is subjected to polymerizing conditions in aqueous emulsion, the improvement which comprises introducing a mixture of monomers of the polymerizable compounds to the reaction mixture at about the moment when copolymerization begins, the composition of the added monomers being substantially the same as the composition of the monomer constituents chemically combined in the copolymer; continuing the addition of the monomer mixture during the course of the copolymerization at about the rate at which copolymer is formed so that the composition of the monomers undergoing copolymerization does not change appreciably during the copolymerization; and stopping the copolymerization at about the same time that addition of further monomers to the polymerizing mixture is discontinued.

WILLEM LEENDERT JOHANNES DE NIE.

REFERENCES CITED

The following references are of record in the file of this patent:

UNITED STATES PATENTS

| Number | Name | Date |
|---|---|---|
| 2,339,184 | Neher et al. | Jan. 11, 1944 |
| 2,363,951 | Fikentscher | Nov. 28, 1944 |
| 2,420,330 | Shriver et al. | May 13, 1947 |